(No Model.)
L. HECK.
FLUSH SWITCH.
No. 588,428.  Patented Aug. 17, 1897.
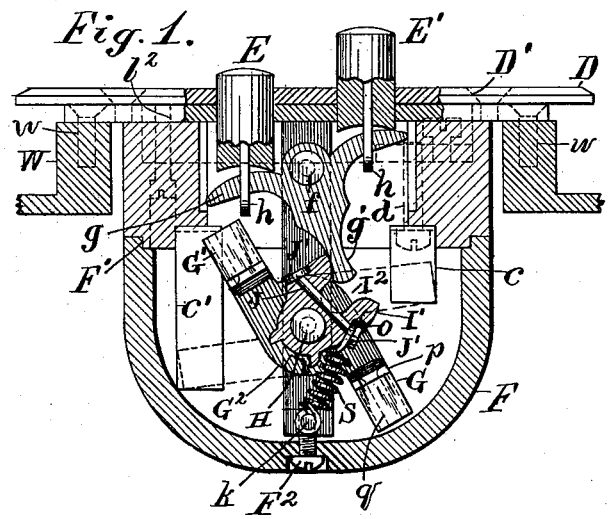
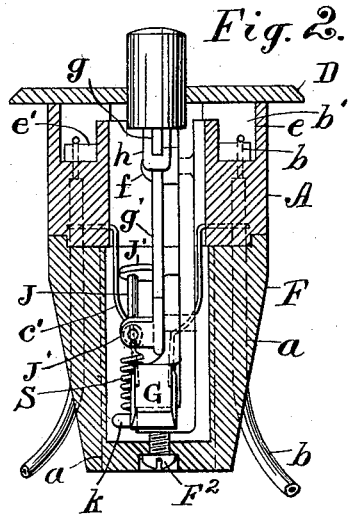
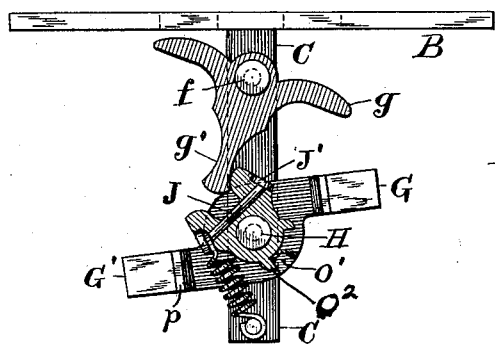
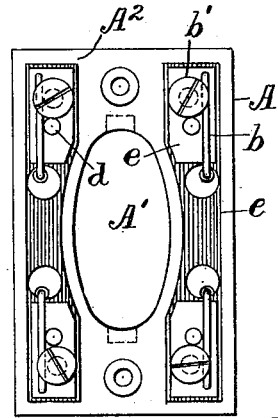
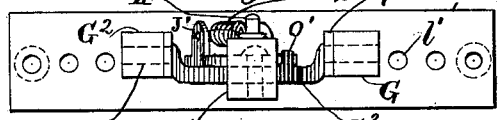
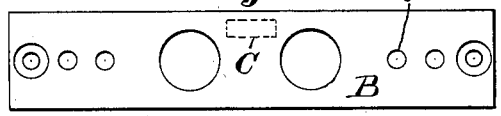
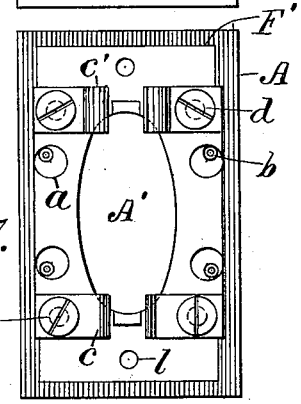
Attest:
L. Lee
Edw. F. Kinsey
Inventor.
Louis Heck, per
Thomas S. Crane, Atty.

UNITED STATES PATENT OFFICE.

LOUIS HECK, OF NEWARK, NEW JERSEY, ASSIGNOR TO WILLIAM J. NEWTON, OF NEW YORK, N. Y.

FLUSH SWITCH.

SPECIFICATION forming part of Letters Patent No. 588,428, dated August 17, 1897.

Application filed April 19, 1897. Serial No. 632,784. (No model.)

*To all whom it may concern:*

Be it known that I, LOUIS HECK, a subject of the Emperor of Germany, residing at Newark, county of Essex, State of New Jersey, have invented certain new and useful Improvements in Flush Switches, fully described and represented in the following specification and the accompanying drawings, forming a part of the same.

The present invention relates to that class of snap-switches in which the actuating handle or button operates upon a spring-dog, which subsequently, under the influence of the spring, actuates the contact-lever, and thus throws it quickly into or out of connection with the stationary contacts.

The switch shown herein is illustrated in connection with certain constructive features which are claimed in W. J. Newton's patent, No. 582,303, granted May 11, 1897, but the improvements in the means for quickly shifting the contact-lever may be used independently of such features.

In the present invention the spring-dog is constructed to oscillate upon the same pivot as the contact-lever and acts upon the lever through the medium of certain pins or studs projected from the lever in the path of the dog. The spring-dog is provided at one side of the pivot with a fulcrum-bar carried by two lugs at equal distances from the pivot, and a spiral spring has a loop or eye at one end fitted movably upon such fulcrum-bar and the opposite end hinged upon a stationary pin in such a relation to the pivot of the dog as to hold the spring at right angles to the fulcrum-bar when the dog is in its intermediate position. Such an intermediate position is one of unstable equilibrium, as the tension of the spring tends to pull the loop toward one end or the other of the fulcrum-bar and operates when such tendency is effective to instantly tip the dog in a corresponding direction. The tension of the spring holds the loop in contact with one or the other of the lugs at the end of the fulcrum-bar until the dog is tipped to its central position, when the tension of the spring slides the loop to the opposite end of the bar and reverses the action of the spring upon the dog. The spring-dog is arranged to oscillate about ninety degrees, the first half of such movement being effected by a manual lever actuated by suitable handle or push-buttons and the remaining half of the movement being effected by the shifting of the spring-loop to the opposite end of the fulcrum-bar and its subsequent action upon the dog. The legs which carry the ends of the fulcrum-bar serve as stops for the loop as it slides upon the bar, and such stops may be provided in any equivalent manner.

In the drawings the movable parts of the switch are shown fixed to the post of a T-shaped frame which is secured in a rectangular block of insulating material, the outer side of which is covered by a face-plate, and all the metallic parts of the switch are inclosed in an arched cap of insulating material, which is rabbeted about the edges of the rectangular block and is held in place by a single screw inserted through the cap into the end of the metal post. The arched shape of such metallic cap gives it great strength and avoids the breaking of such caps, which is very common where they are formed of other shapes.

The invention will be understood by reference to the annexed drawings, in which—

Figure 1 is a longitudinal section of the switch upon the center line where hatched, the remaining parts being shown in elevation. Fig. 2 is a transverse section of similar character. Fig. 3 is an elevation of the metallic frame with the parts which are pivoted thereon. Fig. 4 is a plan of the metallic frame viewed from the lower end, and Fig. 5 a plan of the metallic frame viewed from the upper end; Fig. 6, the upper side of the rectangular insulating-block; and Fig. 7 the lower side of the same, both views showing the electrical connections which are secured upon the block. Fig. 8 is a plan, and Fig. 9 is a side elevation of the switch with all the parts connected.

A designates the rectangular insulating-block with perforation A' through the same and groove A² in the top to admit the cross-bar B of the metallic frame to which the post C is attached. The face-plate D is secured to the cross-bar by screws D', and push-pins E E' are inserted through the plate and cross-bar. A T-shaped manual lever is pivoted upon the post C, as well as a contact-lever to be oscillated by the same. The arched cap F is fitted to rabbet F' around the lower edge of the block A and secured by screw F², inserted through the center of the cap into the end of the post C. Holes *a* are formed through the cap and block A to admit the conductors *b*.

Stationary contacts, formed of leaf-springs *c c'*, are secured upon the under side of the block A by screws *d*, extended to the upper side of the block, where they connect with contact-plates *e*, sunk in recesses *e'* upon the top of the block.

The conductors *b* make connection with the plates *e* by clamp-screws *b'*. The fulcrum *f* of the manual lever is fitted to the post C just below the cross-bar B, and the lever is provided with lateral arms *g* and with central leg *g'*. The arms are arched upon their outer sides, and the push-buttons are concaved upon their inner ends where they touch such arms, and the arms are linked to the push-buttons by loops *h*.

A double-pole switch is shown in the drawings, and the stationary contacts C C' are therefore shown at opposite sides of the post C, and the contact-lever is formed with insulated contact-blocks G and G' at its opposite ends to contact, respectively, with the leaves *c* and *c'*. The middle of the contact-lever is formed of a flat plate G², pivoted upon a stud H upon the post C, and the plate or body I of the spring-dog is mounted upon the same pivot upon the surface of the lever G². The spring-dog is formed with two teeth I', having intervening space I², adapted to receive the leg *g'* upon the manual lever, and of greater width than such leg to permit a further movement of the dog after it is partly shifted by the lever.

The fulcrum-bar J is extended transversely across the dog at one side of the pivot H, its ends being supported in lugs J', projected upwardly from the plate I of the dog.

A spiral spring S is hinged at one end upon a pin *k* at the lower end of the post C, the opposite end of the spring having a loop *o*, fitted movably upon the fulcrum-bar J.

The leaves *c'*, which form the stationary contacts at the left side of the post C, are separated at their upper ends and the contact-lever is shown tipped upwardly, so that the contact-block G' clears the leaves at the same time that the contact-block G is turned away from the ends of the leaves *c*. The contact-lever is carried to this position by the tension of the spring S, with the loop *o* adjacent to the right-hand lug upon the dog, but it will be readily understood that if the push-button E' be depressed the dog would be carried to its central position in which the fulcrum-bar would stand transverse to the post when the angular position of the spring, which is represented in Fig. 1, would draw the loop toward the opposite end of the fulcrum-bar and pull the dog into the position shown in Fig. 3. A stud *o'* is shown upon the plate G² of the contact-lever, which stud is pushed by shoulders *o²* upon the dog after the first part of its movement, and the lever is thus carried to the position shown in Fig. 3 and indicated by dotted lines in Fig. 1. When the manual-lever leg *g'* is pushed in the opposite direction by pressing the push E, the dog is first oscillated without moving the contact-lever until the dog is nearly in its central position, when the dog contacts with the opposite side of the stud upon the lever and the remaining movement of the dog under the influence of the spring shifts the lever quickly and withdraws the contact-blocks G G' from the stationary contacts *c* and *c'*, as desired. A portion of the wall-box W is shown in the drawings, and the cross-bar B is shown secured thereto by screws *w*.

The insulating-body A is shown secured to the cross-bar by screws *l²*, (see Fig. 1,) inserted through holes *l* in the body (see Figs. 6 and 7) into threaded holes *l'* in the cross-bar. (See Figs. 4 and 5.)

It will be observed that when the cross-bar is applied to the insulating-body A the post C extends through the same and projects considerably beyond the opposite side, so that the contact-lever, its dog, and operative spring S are accessible for inspection, repairs, or adjustment when the cap F is removed. To inclose these parts, the cap F is made with a deep hollow recess upon the inner side and is readily secured by the single screw F², applied to the end of the post.

I am aware that the T-shaped frame with the manual lever and contact-lever pivoted thereon is claimed in the said W. J. Newton's patent, No. 582,303, and I therefore disclaim such combination, limiting my invention to the improvements herein set forth and claimed.

The insulating-block A is made of such depth as to cover only the manual lever, as the post C, with the contact-lever, the spring-dog, and the spring for actuating the same project upon the opposite side of the block A, (from the cross-bar B,) so that when the cap F is removed these parts are fully exposed for examination, adjustment, or repairs, such parts being fully protected and insulated when in use by the hollow cap F, which incloses the parts and receives them in its interior when secured upon the block A. The rabbet F' holds the cap in place when secured by the single screw F².

The blocks G G' upon the contact-lever are shown tapering in Fig. 2, to depress snugly against the spring-leaves of the stationary contacts *c c'*, and these blocks are shown insulated from the body of the contact-lever by vulcanite bushings *p*, which are fitted upon studs *q* on the ends of the contact-lever.

It is obviously immaterial whether the stud *o'* be formed upon the contact-lever and the shoulders *o²* upon the dog, or vice versa, as any equivalent means would produce the same effect in rocking the contact-lever with the dog when the latter is making the final portion of its oscillation.

The entire construction is very compact and durable and is especially effective in making and breaking the contacts quickly, as the spring-dog, which is actuated positively by the push-buttons, has a movement entirely independent of the contact-lever and is controlled entirely by the spring S when making and breaking the contacts. It is obvious that either of the contacts G or G' could be removed without affecting the operation of the remaining contact-blocks, and such construction would then constitute a single-pole switch. I do not, therefore, limit myself to the particular construction of the lever nor to the number of stationary contacts with which it is arranged to coöperate, as the essential part of the invention is the spring-dog pivoted with the contact-lever and provided with the fulcrum-bar having the spring hinged upon a stationary pin, as described, with means detachably connected to the dog for oscillating it through a portion of its movement and leaving the remainder of the movement to be effected by the tension of the spring.

The teeth I' upon the dog with which the manual lever coöperates are made quite short, and the notch or space I² between the teeth is made wider than the leg of the manual lever, thus forming a detachable connection which permits the dog to move clear of the manual lever when it is actuated by the spring.

Having thus set forth the nature of my invention, what I claim herein is—

1. In an electric switch, the combination, with stationary contacts and a movable contact-lever, of a dog pivoted with the lever and provided with the fulcrum-bar having stops at opposite ends, the spring S hinged upon a stationary pin and having an eye fitted movably to the fulcrum-bar, means as the stud and shoulders to move the contact-lever with the dog, and a manual lever detachably connected with the dog to oscillate the same through a portion of its movement, the remainder of the movement being effected by the tension of the spring upon the fulcrum-bar, substantially as herein set forth.

2. In an electric switch, the combination, with the contact-lever and its pivot H, of the manual lever having a fulcrum $f$ at one side of such pivot, the hinge-pin $k$ at the opposite side of such pivot, the spring-dog mounted upon the contact-lever pivot, to oscillate thereon, and provided with a notch to admit the end of the manual lever, and with lugs J' carrying the fulcrum-bar J, means, as a stud and shoulders, to move the contact-lever with the dog, and the spring S jointed to the hinge-pin $k$, and having loop fitted movably to the fulcrum-bar, substantially as herein set forth.

3. In an electric switch, the combination, with stationary contacts, of the contact-lever and its pivot, the manual lever having a fulcrum at one side of such pivot, and the spring having a hinge-pin at the opposite side of such pivot, the spring-dog mounted upon the contact-lever pivot and the contact-lever having means, as a stud $o'$ and shoulders $o^2$, to move the same with the dog, the dog having a notch adjacent to the manual lever and lugs carrying the fulcrum-bar, the manual lever having a leg fitted loosely to the notch in the dog, and having lateral arms with push-pins linked thereto, and the spring being jointed to the hinge-pin and having the loop fitted movably to the fulcrum-bar, substantially as herein set forth.

4. In an electric switch, the combination, with suitable stationary contacts, of a contact-lever oscillated upon a pivot, a spring-dog movable independently upon the same pivot with means for manually oscillating the same through the first part of its movement in either direction, with means, as a stud $o'$ and shoulders $o^2$ upon the contact-lever and the dog to move the lever with the dog, a spring-stud at one side of the pivot, and lugs upon the dog at the opposite side of the pivot supporting the fulcrum-bar, and the spring hinged upon the spring-pin and having a loop fitted movably upon the fulcrum-bar, and operating when the dog is oscillated through a portion of its movement in either direction to slide upon the fulcrum-bar and complete such movement, and thereby shift the contact-lever, substantially as herein set forth.

In testimony whereof I have hereunto set my hand in the presence of two subscribing witnesses.

LOUIS HECK.

Witnesses:
J. A. MOREHEAD,
T. S. CRANE.